US006876868B2

(12) United States Patent
Crocker et al.

(10) Patent No.: US 6,876,868 B2
(45) Date of Patent: Apr. 5, 2005

(54) SYSTEM AND METHOD FOR PREDICTIVE TRANSMIT POWER CONTROL FOR MOBILE STATIONS IN A MULTIPLE ACCESS WIRELESS COMMUNICATION SYSTEM

(75) Inventors: Ronald T. Crocker, St. Charles, IL (US); Yuda Luz, Buffalo Grove, IL (US); Ron Rotstein, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 550 days.

(21) Appl. No.: 10/118,396

(22) Filed: Apr. 8, 2002

(65) Prior Publication Data

US 2004/0203419 A1 Oct. 14, 2004

(51) Int. Cl.⁷ .............................. H04B 7/216; H04B 1/12
(52) U.S. Cl. ...................... 455/522; 455/69; 370/335; 370/342
(58) Field of Search ........................ 455/522, 69, 63.1, 455/67.11, 67.13; 370/335, 342

(56) References Cited

U.S. PATENT DOCUMENTS

| | | | | |
|---|---|---|---|---|
| 5,596,570 A | * | 1/1997 | Soliman | 370/252 |
| 6,088,335 A | * | 7/2000 | I et al. | 370/252 |
| 6,298,241 B1 | | 10/2001 | Hong | |
| 6,778,840 B2 | * | 8/2004 | Ozluturk et al. | 455/522 |
| 6,781,969 B2 | * | 8/2004 | Nikides et al. | 370/318 |
| 6,813,479 B2 | * | 11/2004 | Voyer | 455/69 |
| 2002/0105923 A1 | | 8/2002 | Nikides et al. | |

FOREIGN PATENT DOCUMENTS

| | | |
|---|---|---|
| EP | 1 037 395 A2 | 9/2000 |
| EP | 1 182 797 A1 | 2/2002 |
| WO | WO 02/45292 A1 | 6/2002 |

* cited by examiner

Primary Examiner—Lee Nguyen
Assistant Examiner—Wen Huang

(57) ABSTRACT

Methods and systems are provided for transmission power control in a multiple access communication system, providing power ramping of a noise floor power level in advance of a high data rate transmission, at a comparatively higher power level, by a mobile station. The preferred method includes receiving a request at a base transceiver station (BTS) for a data transmission by a first mobile station of a plurality of mobile stations (300), the data transmission to have a predetermined data transmission power level; measuring a noise floor power level (305); and comparing the measured noise floor power level to the predetermined data transmission power level (310). When the measured noise floor power level is less than the predetermined data transmission power level, the BTS schedules the data transmission from the first mobile station to occur following the power ramping of the noise floor, and directs the plurality of mobile stations to incrementally increase their transmit power levels to ramp the noise floor power level. Other methodologies to ramp the noise floor power level include injecting analog or simulated noise into the receive path of BTS, or directing the mobile station to transmit meaningless data at increasing power levels prior to transmission of requested data.

46 Claims, 4 Drawing Sheets

SYSTEM AND METHOD FOR PREDICTIVE TRANSMIT POWER CONTROL FOR MOBILE STATIONS IN A MULTIPLE ACCESS WIRELESS COMMUNICATION SYSTEM

FIELD OF THE INVENTION

The present invention is related, in general, to wireless communication systems, and more particularly, to a system and method for predictively controlling the transmission power of a mobile station in a multiple access wireless communication system.

BACKGROUND OF THE INVENTION

In a multiple access wireless communication system, it is highly desirable to maximize system capacity, providing a maximal or optimal level of service to a plurality of mobile stations (also referred to as subscriber units). To ensure a high quality of such service while maintaining system capacity at an optimal level, the transmit power of each mobile station is controlled through messaging from a base transceiver station ("BTS") (also referred to as a base station). Preferably, the BTS issues control messages which provide that each mobile station is transmitting (on the reverse or "up" link) with only a power level necessary to maintain a predetermined link quality and to avoid unduly interfering with other transmitting mobile stations.

In multiple access wireless communication systems, such as code division multiple access ("CDMA") systems, a signal from a mobile station is typically deteriorated by interference from noise in the environment, including signals from other mobile stations. This aggregate noise and interference by other mobile stations may be referred to as the "noise floor" of the communication system. In a CDMA system, with the coding gain provided by signal spreading with a pseudorandom sequence, a BTS may receive a signal transmitted from a mobile station at a prescribed quality level, even though that signal has a power level which is lower than the power of the noise floor. To maintain signal quality, however, the transmit power of a mobile station should not be lower than a predetermined threshold below the noise floor occurring within the system, during any given period of time.

The noise floor within the communication system may be changing, during any period of time, for example, as mobile units become active or inactive. In addition, recent proposals in CDMA communication systems include providing for a mobile station or other subscriber unit to transmit packets of data, at a comparatively high rate. To achieve such desired and comparatively high data rates, however, the transmitted power should be relatively large for packet data transmission compared to the lower data rates used for voice transmission, to enable data transmission with sufficient energy per data bit for maintenance of an acceptable link quality. Because CDMA systems preferably operate with a relatively stable noise floor, and because high speed data transmissions are typically bursty in nature, a sudden onset of a high power, high data rate transmission in a CDMA system may interfere with and cause frame errors and erasures in signals received from lower power, lower data rate transmissions from other mobile stations. Such interference may be noticeable, for example, as perceived by a listener in a voice communication, and generally may be unacceptable as a potential source of subscriber or consumer dissatisfaction.

Other examples of multiple access wireless communication systems exhibiting this characteristic behavior include multiple access Orthogonal Frequency Domain Multiplexing ("OFDM") wireless communication systems and UMTS/WCDMA communication systems.

As a consequence, a need exists for a method and system to control reverse link transmission power of mobile stations in a multiple access system, to enable high power, high data rate transmission, while simultaneously providing acceptable, comparatively high communication link quality for lower data rate transmissions, such as for voice transmission.

SUMMARY OF THE INVENTION

Methods and systems are provided for transmission power control in a multiple access communication system, providing power ramping of a noise floor power level in advance of a high data rate transmission, at a comparatively higher power level, by a mobile station. For purposes of the present invention, "data" as used herein means and refers to any information which may be used in communication, of any kind, including without limitation, voice, video, computer files, web pages, and so on. The preferred method includes receiving a request at a base transceiver station (BTS) for a data transmission by a first mobile station, of a plurality of mobile stations, in which the data transmission will have a predetermined data transmission power level, which is generally significantly higher than the power levels utilized in voice transmission. The BTS measures a noise floor power level, and compares the measured noise floor power level to the predetermined data transmission power level. When the measured noise floor power level is less than the predetermined data transmission power level, the BTS schedules the data transmission from the first mobile station to occur following the power ramping of the noise floor, and directs remaining mobile stations to incrementally increase their transmit power levels to ramp the noise floor power level. Other methodologies to ramp the noise floor power level include injecting analog or simulated noise into the receive path of BTS, or directing the mobile station to transmit meaningless data at increasing power levels prior to transmission of requested data.

The various embodiments of the noise floor power ramping invention enable high power, high data rate transmission, while simultaneously providing acceptable, comparatively high communication link quality for lower data rate transmissions, such as for voice transmission. The preferred embodiments of the noise floor power ramping invention may be implemented within a base station transceiver. In addition, the preferred embodiments are able to be integrated with existing control structures and methods, such as a scheduler and power control loop, without departing from existing standards for multiple access wireless communication systems. Lastly, the preferred embodiments provide such noise floor power ramping predictively, in anticipation of high data rate transmissions.

Numerous other advantages and features of the present invention will become readily apparent from the following detailed description of the invention and the embodiments thereof, from the claims and from the accompanying drawings.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE INVENTION

Figure 1:
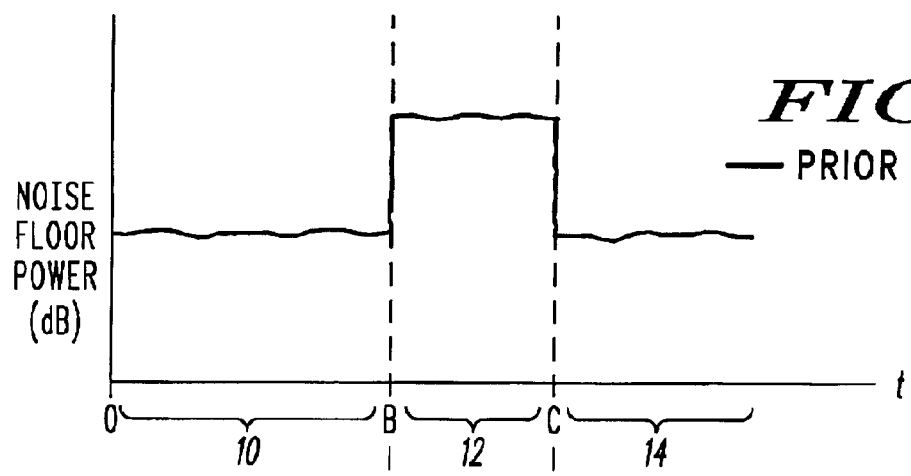
FIG. 1 is a graph depicting noise floor power versus time, in the prior art.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

In accordance with the present invention, several methods and systems are provided to predict and control reverse link transmission power of mobile stations in a multiple access wireless communication system. The various embodiments of the present invention enable high power, high data rate transmission, while simultaneously providing acceptable, comparatively high communication link quality for lower data rate transmissions, such as for voice transmission. While preferred embodiments are illustrated, it will be understood by those of skill in the art that the other embodiments of the present invention may be preferable under other circumstances and depending upon the selected multiple access wireless communication system.

As indicated above, a sudden increase in the power level of a reverse link transmission from a mobile station will generally and significantly interfere with the lower power transmissions from other mobile stations. As a consequence, in multiple access wireless communication systems, base transceiver stations typically have monitored these power levels, and direct each mobile station within its coverage area to transmit at a particular power level, using a standardized messaging format, such that the received power level (or, equivalently, received energy level) at the BTS is approximately the same for each mobile station. Sudden power level changes are generally avoided, through a feedback loop in the receiver of the BTS, referred to as a power control loop ("PCL").

In addition, within a BTS, a "scheduler" mechanism operates to assign each mobile station to available forward and reverse links or channels for communication. When the BTS receives a request from a mobile station for a high data rate transmission, the scheduler will assign the mobile station to a particular channel, start time and duration (which may be a variable duration) for that transmission. (As used herein, the terminology "time slot" will be used to refer to this combination of channel, start time, and duration, which is assigned for a high data rate transmission). As a consequence, the BTS has knowledge, in advance, of precisely when the anticipated high data rate burst will occur (or when it is scheduled to occur). The present invention utilizes this information, as an anticipated occurrence of a large increase in a reverse link transmitted power level, and in advance of such a power level increase (or spike), to predictively ramp the transmit power levels of the other mobile stations in the coverage area, to avoid interference with their transmissions by the high speed, high power data transmitting mobile station.

For ease of reference herein, assuming a plurality of mobile stations within a geographic coverage area of a BTS, those mobile stations ("MSs") which will transmit data at a comparatively or relatively high transmission rate (or high speed), at comparatively higher power levels, will be referred to as "high data rate" mobile stations (or high data rate MSs). Those mobile stations of the plurality which are not transmitting data at a comparatively high transmission rate, such as users transmitting voice data at a comparatively lower transmission rate, will be referred to as "low data rate" or "remaining" mobile stations (or remaining MSs). It should be noted that any given mobile station, at any given time, may be a high data rate MS or a low data rate MS, depending upon its selected use at that time, such as for high speed data or for low speed (voice) data communication. As a consequence, in accordance with the present invention, in anticipation of a transmission by a high data rate MS, the BTS will predictively ramp (increase) the transmit power levels of the remaining mobile stations, to avoid anticipated interference with their reverse (or up) link transmissions.

FIG. 1 is a graph depicting, in a simplified manner, noise floor power versus time, in the prior art. As illustrated in FIG. 1, the noise floor power is substantially constant during the time interval 10, from time zero to time B. Beginning at time B, all remaining mobile stations are directed to substantially increase their transmit power levels (e.g., 16 dB), in one step, to avoid interference from a bursty, high data rate transmission from a high data rate mobile station, resulting in is a sharp increase in noise floor power, persisting during the time interval 12 (through time C). Following the cessation of the high data rate transmission at time C, during time interval 14, without continued messages from the BTS to the MSs to maintain higher power levels, the mobile stations reduce their transmit power levels and the noise floor recovers to its previous level.

This single step increase in transmit power of the remaining MSs, however, resulting in a significant and sudden increase in noise floor power, is highly problematic for the decoder within the BTS receiver (causing a significant change in $E_b/N_0$), resulting in an effective or complete erasure of all data (traffic frames) in that particular time slot (occurring at approximately time B). As a consequence, such a single step increase in the transmit power of the remaining mobile stations is highly undesirable, and is expressly avoided with the present invention.

Figure 2:
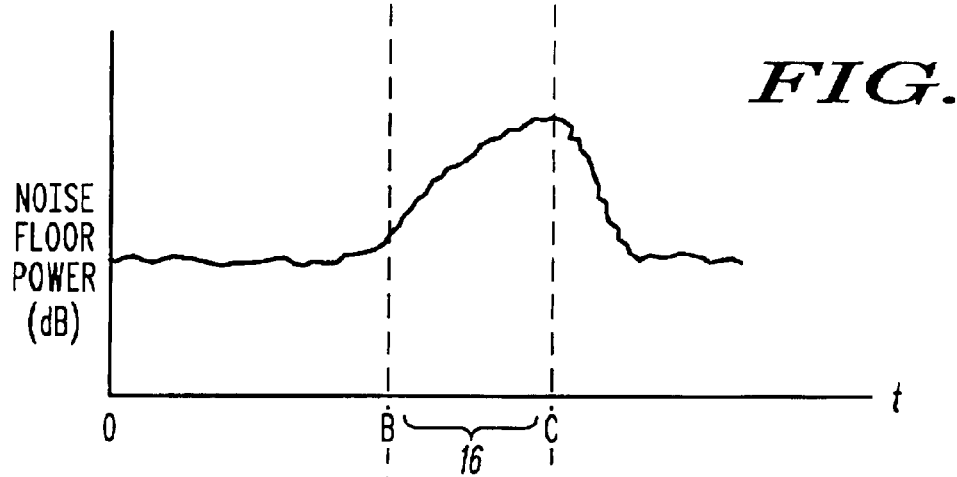
FIG. 2 is a graph depicting noise floor power versus time, using power ramping directed to a high data rate mobile station for data transmission.

FIG. 2 is a graph depicting noise floor power versus time, using power ramping directed to a "high data rate" mobile station for high data rate transmission. In the scenario illustrated in FIG. 2, the high data rate mobile station is directed to slowly increase (in multiple, small steps or increments, beginning at time B) its transmit power level for its high data rate transmission. With this slower increase, the existing power control loop within the BTS is able to accommodate the increased power levels, directing the remaining mobile stations to increase their transmit power levels, illustrated as the approximately continuous noise floor power increase in time interval 16. While this method may avoid interference with the remaining mobile stations from the high power, high data rate transmission, there is nonetheless a large variance in transmitted power in the time slot of the high data rate MS, resulting in a high error rate for the first data frame in that time slot and, as a consequence, generally may also be undesirable.

Figure 3:
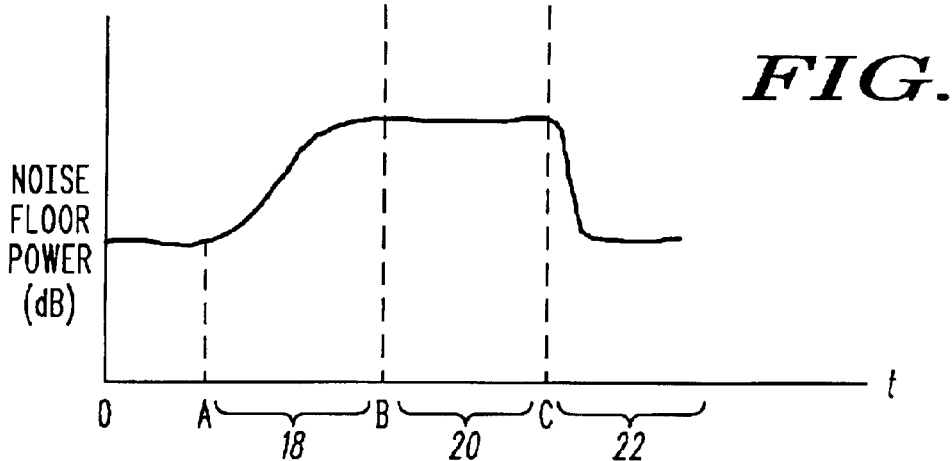
FIG. 3 is a graph depicting noise floor power versus time, using power ramping of the noise floor in accordance with the present invention.

FIG. 3 is a graph depicting noise floor power versus time, using power ramping of the noise floor in accordance with the present invention. Anticipating a high power, high data rate transmission in a time slot commencing at time B, in accordance with the various embodiments of the present invention, the mobile stations are instructed to increase their transmit power levels, in comparatively small increments, such as 1 dB increments, commencing at an earlier time A, and to continue such incremental power increases through approximately time B, as illustrated. Depending upon the selected embodiment, as discussed in greater detail below, the BTS will instruct one or more of the high data rate mobile stations, all of the remaining mobile stations, or another combination of high data rate and remaining mobile stations, to increase their transmit power levels, in comparatively small increments, in anticipation and in advance of a high data rate transmission. As a consequence, the noise floor power will gradually and continuously increase during time interval 18, as illustrated. With the commencement of a high data rate transmission in a time slot at approximately time B, no data frames from the high data rate MS will be lost. Because the remaining mobile stations are transmitting in the reverse link at an appropriate power level given the increased noise floor due to the high data rate transmission, illustrated as a relatively constant and raised noise floor power level in interval 20, their transmissions will not suffer interference from the transmission of the high data rate MS. Subsequent to the high data rate transmission (and assuming no additional or further high data rate transmissions), at approximately time C, the noise floor power level is allowed to drop incrementally, without intervention from the power control loop, as mentioned above and illustrated as interval 22, recovering to its previous level. While not separately illustrated in FIG. 3, in the event of additional or further high data rate transmissions, the noise floor power level will be maintained at the higher level (of interval 20), rather than being allowed to incrementally drop to a lower level used for comparatively lower data rate transmissions, such as for voice transmissions, during interval 22.

In accordance with the present invention, the noise floor power in the coverage area of a particular BTS is incrementally raised, in an approximately continuous manner using relatively small increments, to a power level comparable to the power level to be utilized for a high data rate transmission in the reverse link, in anticipation of typically bursty, high data rate traffic. The noise floor power level is than comparable to the power level for a high data rate transmission, prior to or concurrently with the commencement of the high data rate transmission, avoiding any interference or lost data frames, as discussed above. In the various embodiments of the present invention, as a consequence, using various methods, the mobile stations within the coverage area of a BTS will be instructed by the BTS to increase their transmit power levels, in advance of a high data rate transmission in the reverse link. Several methods of the present invention utilize some form of "injected noise" or "inserted or added noise" into the communication system, forcing the power control loop to thereby ramp the noise floor power level in advance of the high data rate transmission. The preferred embodiment introduces and utilizes an offset level within the power control loop, also providing for (or "spoofing") the power control loop to thereby ramp the noise floor power level in advance of the high data rate transmission.

A first method for power ramping of the noise floor, in accordance with the present invention, utilizes the messaging from the BTS to the high data rate mobile station. As mentioned above, when the BTS receives a request from a mobile station for a high data rate transmission, the BTS will transmit an "assignment" message to that mobile station, indicating the time slot, the transmission rate, and for how long the high data rate MS may transmit its data. In accordance with the present invention, the assignment message is modified, to also direct the high data rate MS to begin ramping its power level, preferably in 1 dB increments, a predetermined number of power control time slots in advance of its high speed data transmission, through transmission of "dummy" or meaningless data, for example. Within the coverage area of the BTS, such data appears as a slowly increasing noise level, and the existing power control loop then directs the remaining mobile stations to correspondingly increase their transmit power levels, effectively ramping the noise floor power level (as illustrated, for example, in interval 18 of FIG. 3).

A second method for power ramping of the noise floor, in accordance with the present invention, injects (analog) noise into the receiver path within the BTS receiver, also in small increments, prior to analog to digital (A/D) conversion within the receiver path. A third method for power ramping of the noise floor, in accordance with the present invention, injects digital or simulated noise into the receiver path within the BTS receiver, also in small increments, for example, during demodulation and prior to decoding within the receiver path. Both of these methods provide injected noise into the receiver path of the BTS, and effectively deceive or "trick" the existing power control loop into measuring a higher noise level and directing the mobile stations within its coverage area to increase their transmit power levels. By doing this in small increments, in advance of the high data rate transmission, the second and third methods of the invention effectively ramp the noise floor power level (as illustrated, for example, in interval 18 of FIG. 3).

Figure 4:
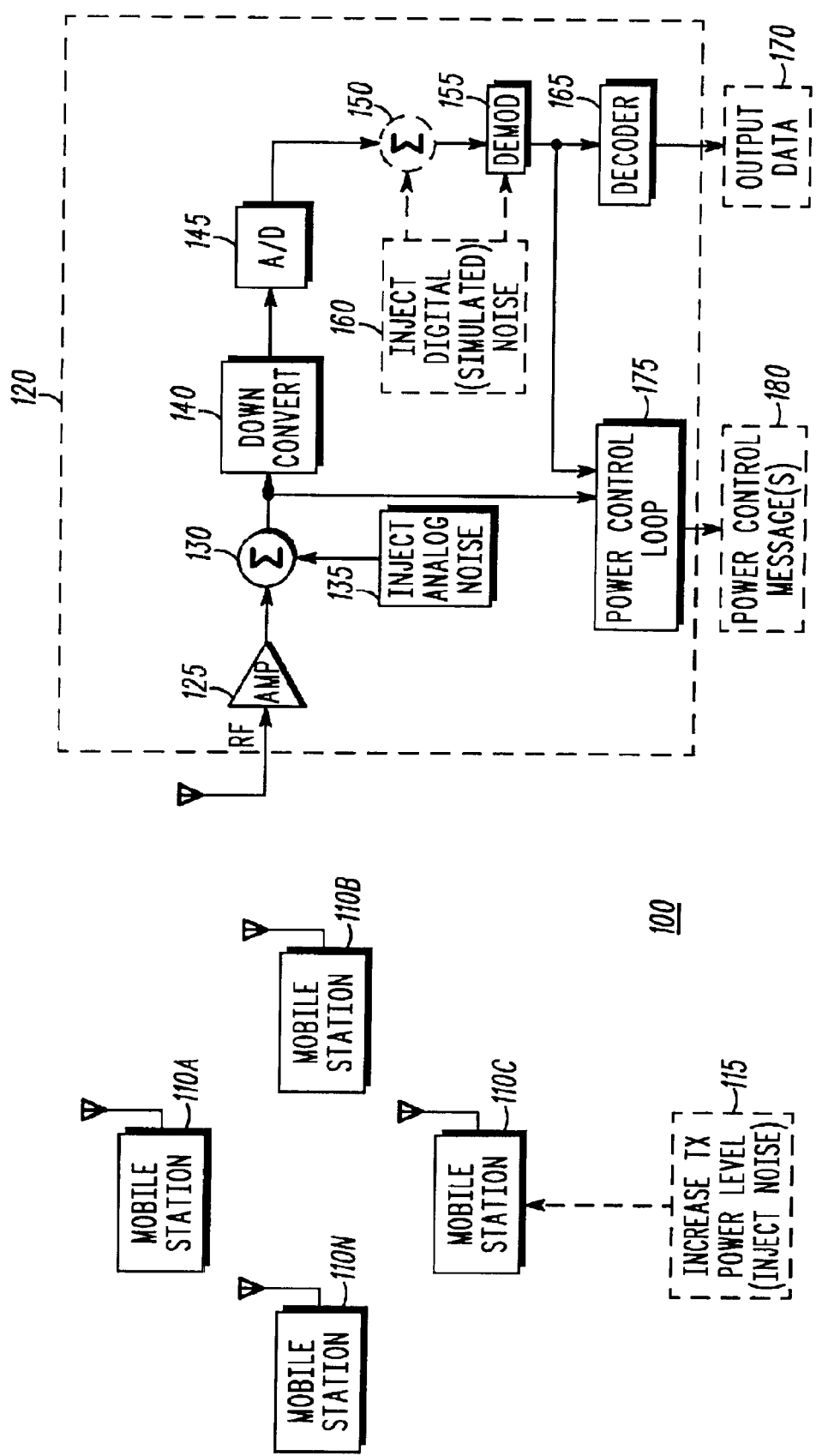
FIG. 4 is a block diagram illustrating various system embodiments for power ramping of the noise floor in accordance with the present invention.

FIG. 4 is a block diagram illustrating various system 100 embodiments for power ramping of the noise floor in accordance with the present invention, corresponding to the three methods discussed above. As illustrated in FIG. 4, a plurality of mobile stations 110, illustrated as mobile stations 110A through 110N, are within the geographic coverage area of a base transceiver station (BTS) 120. Mobile station 110C has requested a high data rate transmission and, as illustrated, mobile stations 110A, 110B and 110N are remaining mobile stations. Utilizing the first method discussed above, high data rate MS 110C is directed to increase its transmit power level, such as through transmission of meaningless data packets, thereby providing injected noise into the system 100, illustrated as dashed block 115.

Continuing to refer to FIG. 4, implementations of the second and third methods of noise injection are illustrated in a receiver path of the BTS 120 (and, for ease of reference, other portions of the BTS 120 are not illustrated). Following amplification (125) of a received signal, analog noise is injected (dashed block 135) into the receive path (summer 130), utilizing the second method discussed above. Alternatively, following down conversion of the received signal (140) and A/D conversion (145), digital (or simulated) noise may be injected (dashed block 160) through either a summer 150 or within a demodulator 155. The demodulated output is decoded (165) to produce output data (dashed block 170). In addition, input is provided into the power control loop 175, either from the analog portion of the receive path (when analog noise is injected) or from the demodulated output (from demodulator 155) (when either analog or digital noise is injected), to provide for the power control loop 175 to respond to the injected noise and to increase and ramp the noise floor power level through power control messages (dashed block 180).

While effectuating the desired noise floor power ramping, the first three methods are not considered ideal, as each involves an actual increase in noise levels within the receive path of the BTS 120 and, as a consequence, and at a minimum, must degrade system performance, as the quality of the signal reaching the decoder in the BTS receive path has necessarily decreased. As real energy is utilized for noise injection in the first two methods, however, the stability of the power control loop is largely unaffected. The second and third methods of injecting noise into the receiver path, namely, injecting either analog or digital noise, are relatively straightforward to implement and control, and do not require any changes to the standardized assignment message format. As discussed in greater detail below, the fourth and preferred method of the present invention does not suffer from any diminished system performance, does not require any changes in wireless communication standards, and does not interfere with the stability of the power control loop.

Figure 5:
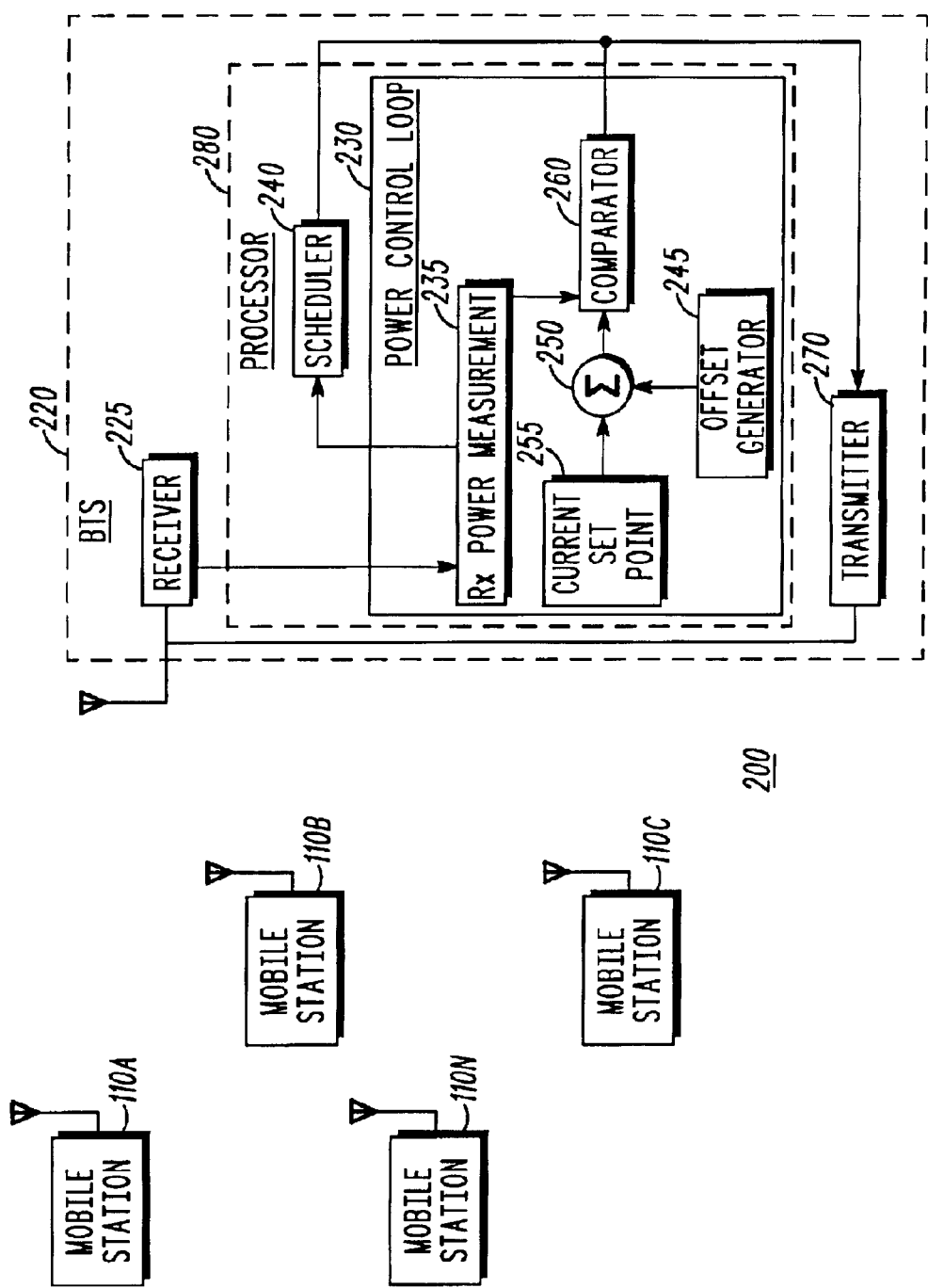
FIG. 5 is a block diagram illustrating a preferred system embodiment for power ramping of the noise floor in accordance with the present invention.

Rather than injecting actual or simulated noise into the receive path of the BTS, the fourth and preferred method of the present invention introduces an "offset" into the power control loop of the BTS, until the noise floor power level has been ramped to the desired level, in advance of the scheduled high data rate transmission. FIG. 5 is a block diagram illustrating a preferred system 200 embodiment for power ramping of the noise floor in accordance with the present invention. As illustrated in FIG. 5, a plurality of mobile stations 110, also illustrated as mobile stations 110A through 110N, are within the geographic coverage area of a base transceiver station (BTS) 220. Mobile station 110C has requested a high data rate transmission and, as illustrated, mobile stations 110A, 110B and 110N are remaining mobile stations. For purposes of the present invention, the BTS 220 includes a receiver 225, a transmitter 270, and a processor 280 (which includes a scheduler 240 and power control loop 230) as illustrated, with the understanding that there are many other significant portions of the BTS 220 which are not separately illustrated.

The processor 280 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 6, with associated memory, such as microprocessor memory or additional RAM, ROM, EPROM or E$^2$PROM. The methodology of the invention, as discussed above with reference to FIGS. 1 through 4 and as discussed below with reference to FIG. 6, may be programmed and stored, in the processor 280 with its associated memory and other equivalent components, as a set of programs or instructions for subsequent execution when the processor 280 is operative (i.e., powered on and functioning).

The processor 280 includes a scheduler 240, and a power control loop 230, both of which generally operate as processes or functions within the processor 280. The power control loop 230 includes additional functions or processes, including power measurement 235, comparator 260, offset generator 245, and a current set point function 255. Additional memory such as RAM (not illustrated) may also be provided within BTS 220.

Continuing to refer to FIG. 5, the power control loop 230 within the processor 280 of BTS 220, in general, monitors the received power (or energy) level (or, equivalently, noise floor power level) at the BTS 220, in power measurement block 235. When the BTS 220 receives a request for a high data rate transmission in the reverse link, in this case from MS 110C, the scheduler 240 (within processor 280) compares its current noise floor power level (from power measurement block 235) with a desired power level for a high data rate transmission. When the current noise floor power level is lower than the desired power level, the scheduler 240 will enable an offset function (offset generator 245) in the power control loop 230, to begin the noise floor power ramping of the present invention. The scheduler 240 (or other processing capability of processor 280) will also inform the high data rate mobile station 110C when it may commence data transmission (in an assignment message for transmission by the transmitter 270), allowing for a sufficient number of iterations of the power control loop 230 to occur in advance, for the ramping of the noise floor power level to the desired noise floor power level (such as the level illustrated in interval 20 of FIG. 3). The offset, such as a step function, produced by offset generator 245, is added (summer 250) with the current set point (block 255) of the power control loop 230, and compared (comparator 260) to the current noise floor power measured (block 235). When the new power control loop set point (current set point plus offset) is greater than the measured noise floor power, as determined in the comparator 260, the power control loop 230 generates a power control message, for transmission by the transmitter 270 to the remaining mobile stations 110, instructing the remaining MSs 110 to increase their transmit power levels, preferably in 1 dB increments, by setting a power control bit. As the noise floor power rises to the desired level to avoid interference and lost data frames, the scheduler 240 (or other processing capability of processor 280) may then disable the offset generator 245 (i.e., to provide no offset or, equivalently, an offset equal to zero). When the power control loop set point (current set point plus zero offset) is not greater than the measured noise floor power, as determined in the comparator 260, the power control loop 230 ceases to direct the remaining mobile stations 110 to increase their power levels, such as by resetting the power control bit in a power control message. (While the BTS 220 is illustrated utilizing a scheduler 240 and power control loop 230, those of skill in the art will recognize that the functions of the present invention discussed above may be carried out utilizing a wide variety of equivalent structures and apparatuses).

Figure 6:
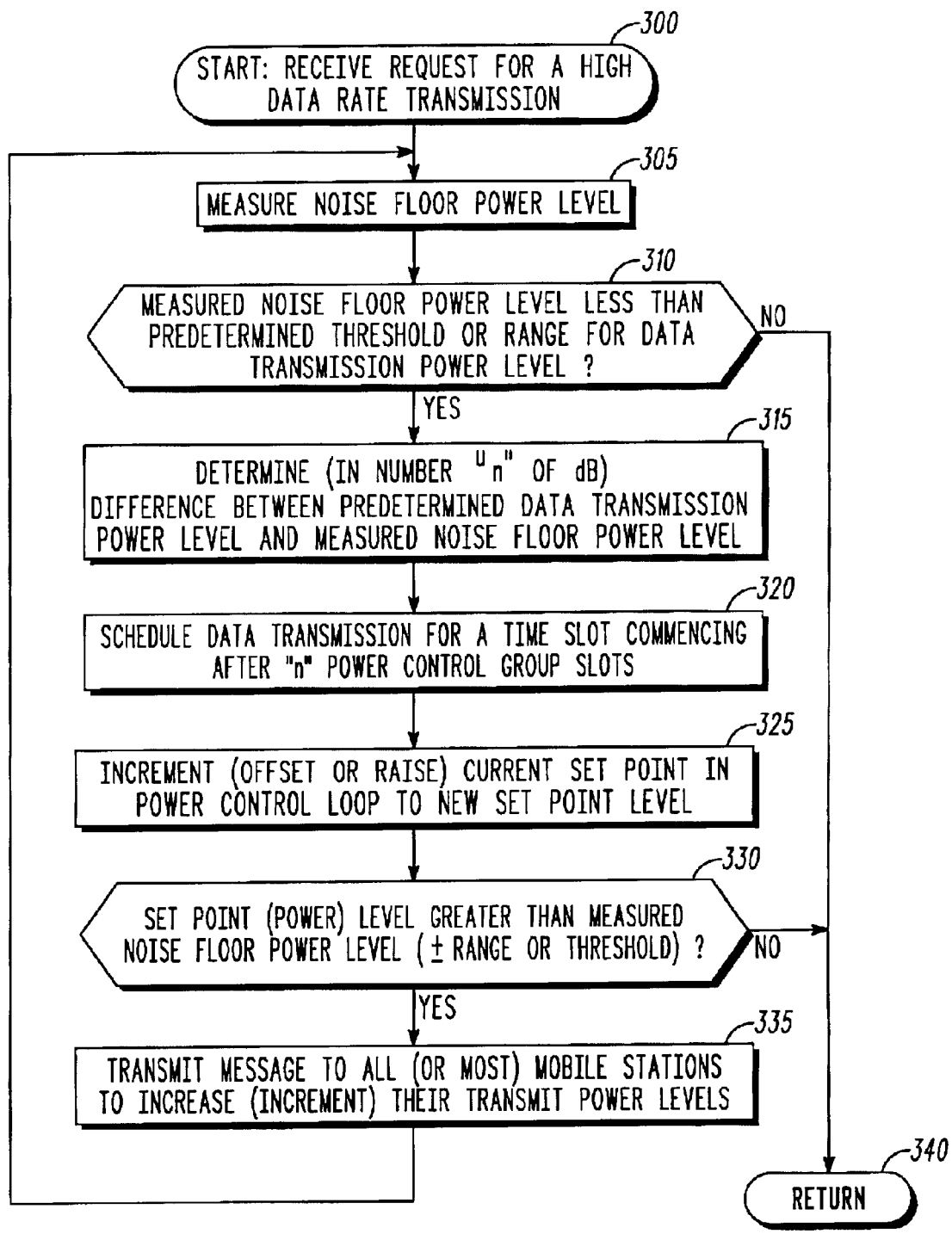
FIG. 6 is a flow diagram illustrating a preferred method embodiment for power ramping of the noise floor in accordance with the present invention.

FIG. 6 is a flow diagram illustrating this preferred method embodiment for power ramping of the noise floor, and provides a useful summary of the present invention. As indicated above, this method is preferably implemented within a base station transceiver, such as in a scheduler 240 and power control loop 230 of BTS 220, or equivalently, within any other mechanisms or structures which are capable of carrying out the functions discussed below.

Referring to FIG. 6, the preferred method begins, start step 300, with the reception of a request from a mobile station for a high data rate transmission. The current noise floor power level is measured or determined, step 305, and the measured noise floor power level is compared to a selected or desired noise floor power level for a high data rate transmission, step 310. When the measured noise floor power level is not less than the desired or selected power level in step 310, the noise floor level is suitable for high data rate transmission, and the method may end, return step 340.

When the measured noise floor power level is less than the desired or selected power level in step 310, the difference between the selected power level for high data rate transmission and the current, measured noise floor power level is determined, preferably as a difference measured as a number "n" of dB increments, step 315. Using this information, the high data rate transmission may then be scheduled for transmission in a time slot commencing after "n" power control group time slots, step 320, to allow sufficient time for the noise floor power ramping (which preferably corresponds to "n" iterations using 1 dB increments of transmit power ramping). Alternatively and more generally for steps 315 and 320, defining the measured power difference (difference between the selected power level for high data rate transmission and the current, measured noise floor power level) as "d", the number of iterations as "n", and the power change per step (iteration) as "k", then the number of iterations $n=d/k$, with $k=1$ dB an expected value, not a required value. The current set point in the power control loop is then incremented (offset or raised), step 325, and the (new) set point level is compared to the measured noise floor power level, step 330. In the preferred embodiment, the set point of the power control loop is preferably established in units which provide for a ready comparison to measured noise floor power levels, for ease of implementation of step 330. When the set point of the power control loop is not greater than the measured noise floor power level in step 330, the method may also end, return step 340, as the noise floor power level is sufficiently high to enable the high data rate transmission without undue interference or other data frame losses. When the set point of the power control loop is greater than the measured noise floor power level in step 330, a message is transmitted to the plurality of mobile stations to increase their transmit power levels, step 335. Following step 335, the method returns to step 305, to again measure the noise floor power level, and determine if additional increases are needed, as further iterations of steps 305 through 335, inclusive.

Numerous advantages of the present invention may be readily apparent. The various embodiments of the noise floor power ramping invention enable high power, high data rate transmission, while simultaneously providing acceptable, comparatively high communication link quality for lower data rate transmissions, such as for voice transmission. Second, the preferred embodiments of the noise floor power ramping invention may be implemented within a base station transceiver. Third, the preferred embodiments are able to be integrated with existing control structures and methods, such as a scheduler and power control loop, without departing from existing wireless communication standards. Lastly, the preferred embodiments provide such noise floor power ramping predictively, in anticipation of high data rate transmissions.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for transmission power control in a multiple access communication system having a plurality of mobile stations, the method comprising:

(a) receiving a request for a data transmission by a first mobile station of the plurality of mobile stations, the data transmission to have a predetermined data transmission power level;

(b) measuring a noise floor power level;

(c) comparing the measured noise floor power level to the predetermined data transmission power level;

(d) when the measured noise floor power level is less than the predetermined data transmission power level, scheduling the data transmission from the first mobile station to occur following an increase in the measured noise floor power level to within a predetermined threshold of the predetermined data transmission power level; and (e) when the measured noise floor power level is less than the predetermined data transmission power level, directing the plurality of mobile stations to incrementally increase their transmit power levels until the measured noise floor power level is within the predetermined threshold of the predetermined data transmission power level.

2. The method of claim 1, wherein step (d) further comprises:

when the measured noise floor power level is within the predetermined threshold of the predetermined data transmission power level, providing for the first mobile station to transmit data at a first data rate while remaining mobile stations of the plurality of mobile stations transmit data at a second data rate, the first data rate comparatively greater than second data rate.

3. The method of claim 1, wherein step (d) further comprises:

determining a difference between the predetermined data transmission power level and the measured noise floor power level;

based upon the difference between the predetermined data transmission power level and the measured noise floor power level, scheduling the data transmission from the first mobile station.

4. The method of claim 3, wherein:

the difference between the predetermined data transmission power level and the measured noise floor power level is determined as an aggregate number of decibels; wherein the remaining mobile stations of the plurality of mobile stations are directed to repeatedly increase their transmit power levels by an increment until the aggregate number of decibels has been reached; and wherein the data transmission from the first mobile station is scheduled to commence when the remaining mobile stations have increased their transmit power levels by the aggregate number of decibels.

5. The method of claim 4, wherein the aggregate number of decibels is a number "d", each increment is "k" decibels, and wherein the data transmission from the first mobile station is scheduled to commence following a transmission of "n" power control messages, in which n is approximately equal to the aggregate number of decibels divided by the increment (nd/k), with each power control message providing for a "k" decibel increase in the transmit power level of the remaining mobile stations.

6. A method for transmission power control in a multiple access communication system having a plurality of mobile stations, the method comprising:
(a) receiving a request for a data transmission by a first mobile station of the plurality of mobile stations, the data transmission to have a predetermined data transmission power level;
(b) measuring a noise floor power level;
(c) comparing the measured noise floor power level to the predetermined data transmission power level; and
(d) when the measured noise floor power level is less than the predetermined data transmission power level, incrementally injecting noise into the communication system to raise the measured noise floor power level to within a predetermined range of the predetermined data transmission power level.

7. The method of claim 6, wherein step (d) further comprises:
directing the first mobile station to transmit meaningless data at an incrementally increasing transmit power level, prior to providing for the first mobile station to transmit requested data, until the measured noise floor power level is within the predetermined range of the predetermined data transmission power level.

8. The method of claim 6, wherein step (d) further comprises:
adding analog noise into a receiver of a base transceiver station until the measured noise floor power level is within the predetermined range of the predetermined data transmission power level.

9. The method of claim 6, wherein step (d) further comprises:
adding simulated noise into a demodulator of a base transceiver station until the measured noise floor power level is within the predetermined range of the predetermined data transmission power level.

10. The method of claim 6, further comprising:
when the measured noise floor power level is within the predetermined range of the predetermined data transmission power level, providing for the first mobile station to transmit data at a first data rate and providing for remaining mobile stations of the plurality of mobile stations to transmit data at a second data rate, the first data rate comparatively greater than second data rate.

11. The method of claim 6, further comprising:
determining a difference between the predetermined data transmission power level and the measured noise floor power level;
based upon the difference between the predetermined data transmission power level and the measured noise floor power level, scheduling the data transmission from the first mobile station.

12. The method of claim 6, wherein step (d) further comprises:
directing the plurality of mobile stations to incrementally increase their transmit power levels until the measured noise floor power level is within the predetermined range of the predetermined data transmission power level.

13. The method of claim 12, further comprising:
determining a difference between the predetermined data transmission power level and the measured noise floor power level as an aggregate number of decibels;
directing the plurality of mobile stations to repeatedly increase their transmit power levels in an increment until the aggregate number of decibels has been reached; and
based upon an anticipated time period for the remaining mobile stations to increase their transmit power levels by the aggregate number of decibels, scheduling the data transmission from the first mobile station.

14. The method of claim 13, wherein the aggregate number of decibels is a number "d", each increment is "k" decibels, and wherein the data transmission from the first mobile station is scheduled to commence following a transmission of "n" power control messages, in which n is approximately equal to the aggregate number of decibels divided by the increment (nd/k), with each power control message providing for a "k" decibel increase in the transmit power level of the remaining mobile stations.

15. A method for transmission power control in a multiple access communication system having a plurality of mobile stations, the method comprising:
(a) receiving a request for a data transmission by a first mobile station of the plurality of mobile stations, the data transmission to have a predetermined data transmission power level;
(b) measuring a noise floor power level;
(c) comparing the measured noise floor power level to the predetermined data transmission power level;
(d) scheduling a time period, for the data transmission by the first mobile station, following a power ramping time period; and
(e) when the measured noise floor power level is less than the predetermined data transmission power level, ramping the noise floor power level to within a selected threshold of the predetermined data transmission power level during the power ramping time period.

16. The method of claim 15, wherein step (e) further comprises:
incrementally increasing a set point in a transmit power control loop within a base station transceiver.

17. The method of claim 16, further comprising:
directing the plurality of mobile stations to incrementally increase their transmit power levels until the measured noise floor power level is within the selected threshold of the predetermined data transmission power level.

18. The method of claim 15, wherein step (e) further comprises:
directing the first mobile station to transmit at an incrementally increasing transmit power level, prior to providing for the first mobile station to transmit requested data, until the measured noise floor power level is within the selected threshold of the predetermined data transmission power level.

19. The method of claim 15, wherein step (e) further comprises:
adding analog noise into a receive path of a base transceiver station until the measured noise floor power level is within the selected threshold of the predetermined data transmission power level.

20. The method of claim 15, wherein step (d) further comprises:
adding simulated noise into a demodulator of a base transceiver station until the measured noise floor power level is within the selected threshold of the predetermined data transmission power level.

21. The method of claim 15, further comprising:
following the data transmission from the first mobile station, allowing the noise floor power level to recover to a previous level.

22. A system for transmission power control in a multiple access communication system having a plurality of mobile stations, the system comprising:
means for receiving a request for a data transmission by a first mobile station of the plurality of mobile stations, the data transmission to have a predetermined data transmission power level;
means for measuring a noise floor power level;
means for comparing the measured noise floor power level to the predetermined data transmission power level;
means for scheduling a time period, for the data transmission by the first mobile station, following a power ramping time period; and
when the measured noise floor power level is less than the predetermined data transmission power level, means for ramping the noise floor power level to within a selected threshold of the predetermined data transmission power level during the power ramping time period.

23. The system of claim 22, wherein the means for ramping the noise floor power level further comprises:
means for incrementally increasing a set point in a transmit power control loop within a base station transceiver.

24. The system of claim 23, further comprising:
means for directing the plurality of mobile stations to incrementally increase their transmit power levels until the measured noise floor power level is within the selected threshold of the predetermined data transmission power level.

25. The system of claim 22, wherein the means for ramping the noise floor power level further comprises:
means for directing the first mobile station to transmit at an incrementally increasing transmit power level, prior to providing for the first mobile station to transmit requested data, until the measured noise floor power level is within the selected threshold of the predetermined data transmission power level.

26. The system of claim 22, wherein the means for ramping the noise floor power level further comprises:
means for adding analog noise into a receive path of a base transceiver station until the measured noise floor power level is within the selected threshold of the predetermined data transmission power level.

27. The system of claim 22, wherein the means for ramping the noise floor power level further comprises:
means for adding simulated noise into a demodulator of a base transceiver station until the measured noise floor power level is within the selected threshold of the predetermined data transmission power level.

28. The system of claim 22, further comprising:
following the data transmission from the first mobile station, means for allowing the noise floor power level to recover to a previous level.

29. A system for transmission power control in a multiple access communication system having a plurality of mobile stations, the system comprising:
a receiver for reception of a request for a data transmission by a first mobile station of the plurality of mobile stations, the data transmission to have a predetermined data transmission power level;
a transmitter for transmission of a plurality of messages;
a processor coupled to the receiver and to the transmitter, wherein the processor, when operative, includes instructions to measure a noise floor power level; to compare the measured noise floor power level to the predetermined data transmission power level; the processor including further instructions, when the measured noise floor power level is less than the predetermined data transmission power level, to schedule the data transmission from the first mobile station to occur following an increase in the measured noise floor power level to within a predetermined threshold of the predetermined data transmission power level, and to direct the plurality of mobile stations to incrementally increase their transmit power levels until the measured noise floor power level is within the predetermined threshold of the predetermined data transmission power level.

30. The system of claim 29, wherein the processor includes further instructions to direct the transmitter to transmit an assignment message to the first mobile station, the assignment message containing schedule information for the data transmission.

31. The system of claim 29, wherein the processor includes further instructions to direct the transmitter to transmit a power control message to the plurality of mobile stations, the power control message including a power control bit set for an incremental increase in transmit power.

32. The system of claim 29, wherein the processor includes further instructions, when the measured noise floor power level is within the predetermined threshold of the predetermined data transmission power level, to provide for the first mobile station to transmit data at a first data rate while the remaining mobile stations of the plurality of mobile stations transmit data at a second data rate, the first data rate comparatively greater than second data rate.

33. The system of claim 29, wherein the processor includes further instructions to determine a difference between the predetermined data transmission power level and the measured noise floor power level, and based upon the difference between the predetermined data transmission power level and the measured noise floor power level, to schedule the data transmission from the first mobile station.

34. The system of claim 33, wherein the processor includes further instructions to determine the difference between the predetermined data transmission power level and the measured noise floor power level as an aggregate number of decibels; to repeatedly direct the remaining mobile stations of the plurality of mobile stations to increase their transmit power levels in an increment until the aggregate number of decibels has been reached; and to schedule the data transmission from the first mobile station to commence when the remaining mobile stations have increased their transmit power levels by the aggregate number of decibels.

35. The system of claim 34, wherein the aggregate number of decibels is a number "d", the increment is "k" decibels, and wherein the data transmission from the first mobile station is scheduled to commence following a transmission of "n" power control messages, in which n is approximately equal to the aggregate number of decibels divided by the increment (nd/k), with each power control message providing for a "k" decibel increase in the transmit power level of the remaining mobile stations.

36. A system for transmission power control in a multiple access communication system having a plurality of mobile stations, the system comprising:

a receiver for receiving a request for a data transmission by a first mobile station of the plurality of mobile stations, the data transmission to have a predetermined data transmission power level;

a transmitter for transmission of a plurality of messages;

a processor coupled to the receiver and to the transmitter, wherein the processor, when operative, includes instructions to measure a noise floor power level; to compare the measured noise floor power level to the predetermined data transmission power level; and the processor including further instructions, when the measured noise floor power level is less than the predetermined data transmission power level, to direct an incremental injection of noise into the communication system to raise the measured noise floor power level to within a predetermined range of the predetermined data transmission power level.

37. The system of claim 36, wherein the processor includes further instructions to direct the first mobile station to transmit meaningless data at an incrementally increasing transmit power level, prior to providing for the first mobile station to transmit requested data, until the measured noise floor power level is within the predetermined range of the predetermined data transmission power level.

38. The system of claim 36, wherein the processor includes further instructions to provide for adding analog noise into the receiver until the measured noise floor power level is within the predetermined range of the predetermined data transmission power level.

39. The system of claim 36, wherein the processor includes further instructions to provide for adding simulated noise into a demodulator within the receiver until the measured noise floor power level is within the predetermined range of the predetermined data transmission power level.

40. The system of claim 36, wherein the processor includes further instructions to determine a difference between the predetermined data transmission power level and the measured noise floor power level, and based upon the difference between the predetermined data transmission power level and the measured noise floor power level, to schedule the data transmission from the first mobile station.

41. The system of claim 36, wherein the processor includes further instructions to direct the plurality of mobile stations to incrementally increase their transmit power levels until the measured noise floor power level is within the predetermined range of the predetermined data transmission power level.

42. The system of claim 41, wherein the processor includes further instructions to ramp the noise floor power level by incrementally increasing a set point in a transmit power control loop.

43. The system of claim 41, wherein the processor includes further is instructions to direct the transmitter to transmit an assignment message to the first mobile station, the assignment message containing schedule information for the data transmission.

44. The system of claim 41, wherein the processor includes further instructions to direct the transmitter to transmit a power control message to the remaining mobile stations, the power control message including a power control bit set for an incremental increase in transmit power.

45. The system of claim 41, wherein the processor includes further instructions to determine a difference between the predetermined data transmission power level and the measured noise floor power level as an aggregate number of decibels; to direct the remaining mobile stations of the plurality of mobile stations to increase their transmit power levels in an increment until the aggregate number of decibels has been reached; and based upon an anticipated time period for the remaining mobile stations to increase their transmit power levels by the aggregate number of decibels, to schedule the data transmission from the first mobile station.

46. The system of claim 45, wherein the aggregate number of decibels is a number "d", the increment is "k" decibels, and wherein the data transmission from the first mobile station is scheduled to commence following a transmission of "n" power control messages, in which n is approximately equal to the aggregate number of decibels divided by the increment (nd/k), with each power control message providing for a "k" decibel increase in the transmit power level of the remaining mobile stations.

* * * * *